(12) United States Patent
Lev

(10) Patent No.: US 7,405,927 B2
(45) Date of Patent: Jul. 29, 2008

(54) PUSH-BUTTON LATCHING MECHANISM

(75) Inventor: Jeffrey A. Lev, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 217 days.

(21) Appl. No.: 10/938,791

(22) Filed: Sep. 10, 2004

(65) Prior Publication Data
US 2006/0056140 A1 Mar. 16, 2006

(51) Int. Cl.
*H05K 7/00* (2006.01)
*E05C 5/00* (2006.01)

(52) U.S. Cl. .................. 361/683; 361/681; 292/63; 292/251.5; 292/121; 292/340; 70/58

(58) Field of Classification Search ............. 361/681, 361/683; 312/223.1, 223.2; 248/917–923
See application file for complete search history.

(56) References Cited

U.S. PATENT DOCUMENTS

| | | | |
|---|---|---|---|
| 6,507,485 B2 | 1/2003 | Zadesky | |
| 6,517,129 B1 | 2/2003 | Chien et al. | |
| 6,653,919 B2 | 11/2003 | Shih-Chung et al. | |
| 6,659,516 B2 | 12/2003 | Wang et al. | |
| 6,937,465 B2 * | 8/2005 | Park | 361/683 |
| 7,261,331 B2 * | 8/2007 | Lin | 292/116 |
| 2005/0168923 A1 * | 8/2005 | Huang et al. | 361/683 |
| 2006/0038415 A1 * | 2/2006 | Liu et al. | 292/251.5 |

FOREIGN PATENT DOCUMENTS

| | | |
|---|---|---|
| JP | 08-032254 | 2/1996 |
| JP | 2002-185160 | 6/2002 |

OTHER PUBLICATIONS

Office Action dated Jan. 8, 2008; Japanese Patent Application No. 2005-253435, entitled "Push-Button Latching Mechanism," 3 pp.

* cited by examiner

*Primary Examiner*—Jayprakash Gandhi
*Assistant Examiner*—Zachary M Pape

(57) ABSTRACT

A latching mechanism comprising a hook connected to a first component. The hook has a first position disposed within the first component and a second position extending from the first component. The latching mechanism further comprising a receptacle disposed within a second component and engaged with the hook. A magnet is disposed within the second component and moves the hook from the first position to the second position as the second component is disposed in close proximity to the first component. A push-button release mechanism is disposed within the first component and moves the hook from the second position so as to disengage said hook from said receptacle.

20 Claims, 4 Drawing Sheets

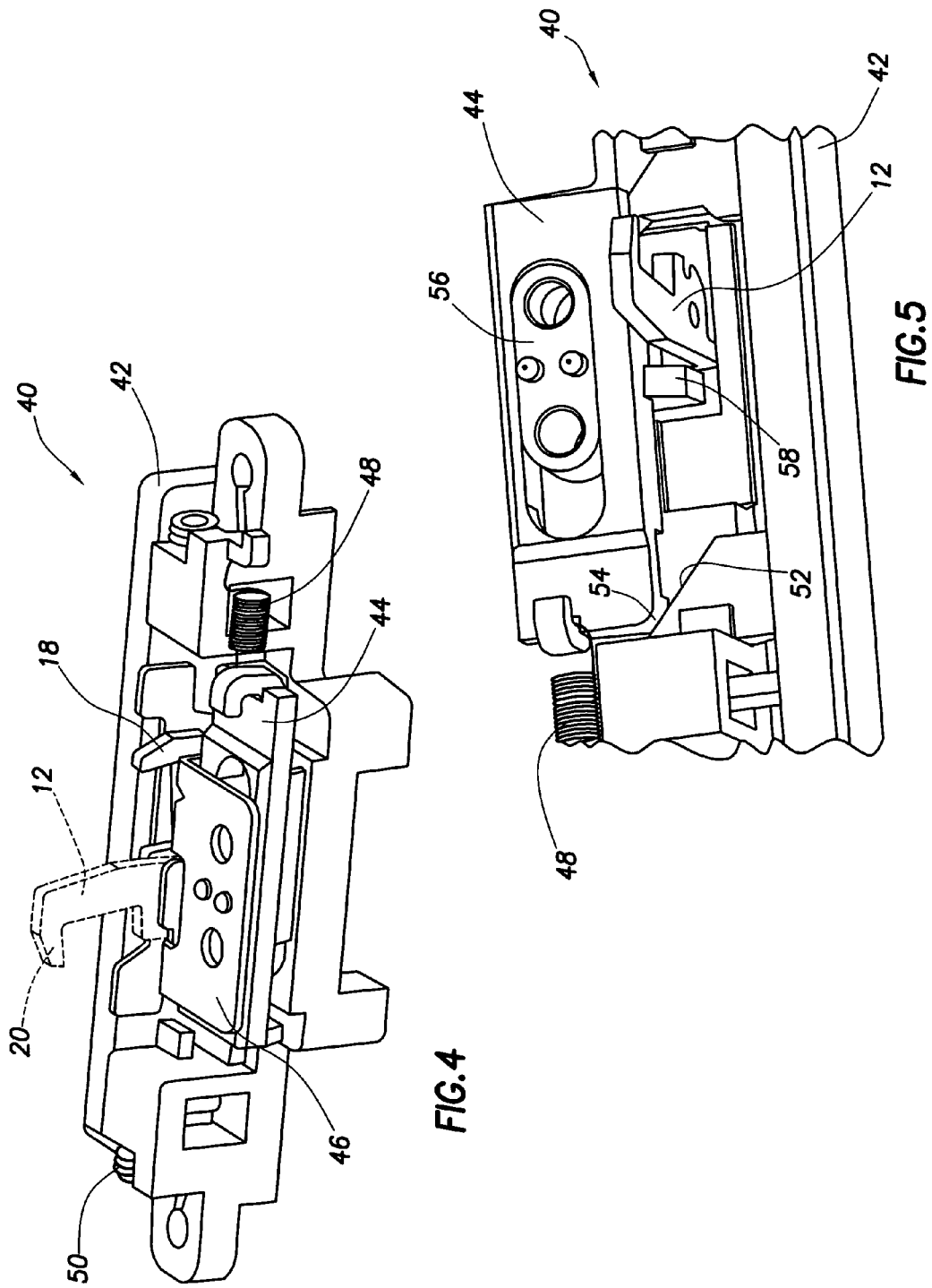

PUSH-BUTTON LATCHING MECHANISM

BACKGROUND

Portable computers are compact, lightweight computing devices and may comprise any portable electronic device, for example, notebook computers, personal digital assistants, tablet personal computers, and laptop computers. Many portable computer systems utilize two rotatably connected components that can be arranged in opened or closed positions as desired. For example, notebook computer systems have a display panel that is rotatably connected to a main computer chassis. The display panel can be closed against the main chassis in a clam-shell type configuration that provides a compact package for portability and protects the screen and keyboard. Many systems include latching mechanisms that connect the display panel to the main body when the display panel is in the closed position.

Latching mechanisms that involve complicated operation, are difficult to use, or require two hands and/or considerable force to operate may not be desirable. Some latching mechanisms require user intervention for engagement and disengagement, thus increasing the difficulty of use. Many latching systems utilize one or more latching members that project above the surface of the system and are susceptible to being caught on something and possibly breaking.

BRIEF SUMMARY

Therefore, as can be appreciated, there is a need for a latching mechanism for portable computer systems that provides simple, compact, one-handed operation. The problems noted above are solved in large part by a latching mechanism comprising a hook connected to a first component. The hook has a first position that is recessed within the first component and a second position extended from the first component. The latching mechanism further comprises a receptacle disposed within a second component and engaged with the hook. A magnet is disposed within the second component and moves the hook from the first position to the second position, as the second component is disposed in close proximity to the first component. A push-button release mechanism is disposed within the first component and moves the hook from the second position so as to disengage said hook from said receptacle.

BRIEF DESCRIPTION OF THE DRAWINGS

For a detailed description of exemplary embodiments of the invention, reference will now be made to the accompanying drawings in which:

FIG. 4 shows a release mechanism in accordance with embodiments of the invention;

FIG. 5 shows a partial view of the release mechanism of FIG. 4;

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to. . . ."

DETAILED DESCRIPTION

Figure 1:
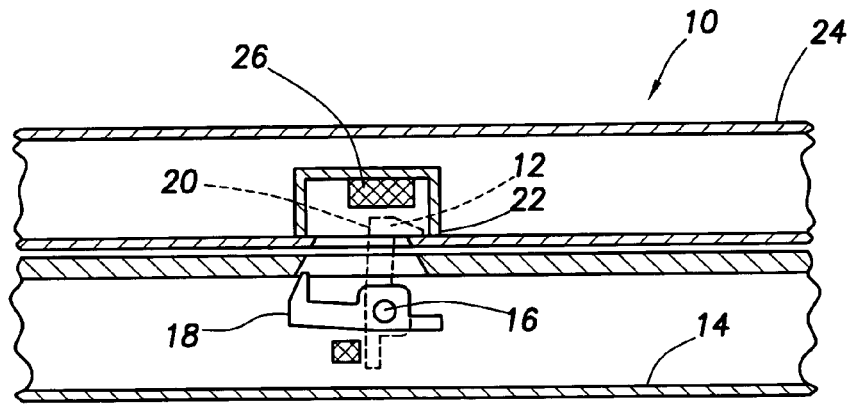
FIG. 1 shows a latching mechanism in a latched position in accordance with embodiments of the invention.

The following discussion is directed to various embodiments of the invention. Referring now to FIG. 1, latch mechanism 10 is shown comprising a hook 12 pivotally attached to a first component 14. Hook 12 is connected at pivot 16 and has a first position 18 recessed within first component 14 and a second position 20 extended from the first component. When in second position 20, hook 12 engages receptacle 22 that is disposed within second component 24. Magnet 26 is disposed within second component 24 and maintains hook 12 in second position 20.

Figure 2:
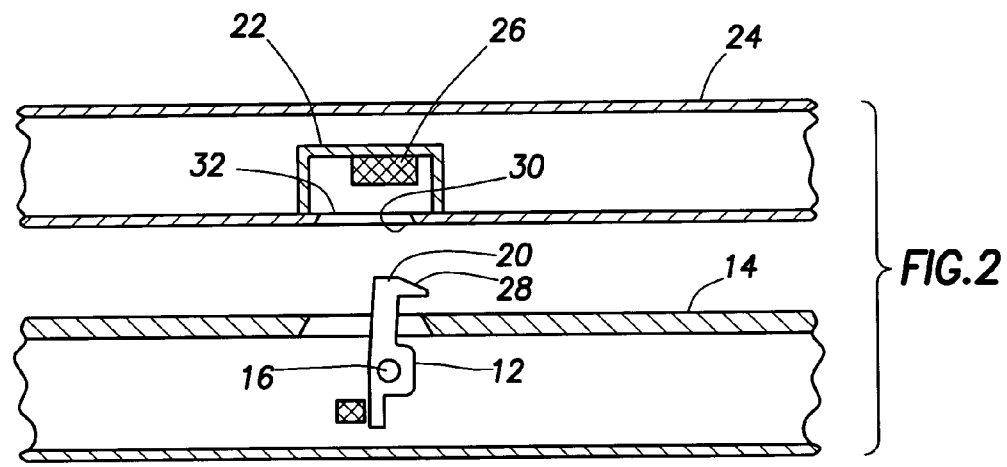
FIG. 2 shows the latching mechanism of FIG. 1 in an unlatched and partially opened position.

As shown in FIG. 2, as first component and second component 24 are disposed close to each other, the magnetic attraction between magnet 26 and hook 12 increases. This magnetic attraction causes hook 12 to rotate upward to second position 20. Thus, as the components are moved in close proximity to each other, hook 12 will automatically move from first position 18 to second position 20. As the components are moved adjacent to each other, upper edge 28 of hook 12 contacts surface 30 of second component 24 and causes the hook to temporarily rotate and enter aperture 32 of receptacle 22. Magnet 26 maintains hook 12 in the second position 20 and engaged with receptacle 22.

Figure 3:
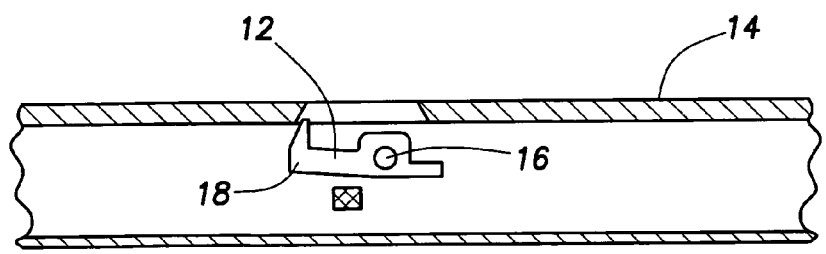
FIG. 3 shows the latching mechanism of FIG. 1 in an unlatched and fully open position.

Referring now to FIG. 3, latch mechanism 10 is shown in an unlatched position where first component 14 is moved away from the second component (not shown). As the distance between magnet 26 and hook 12 increases, the magnetic force acting on the hook decreases. Hook 12 is biased to first position 18 such that, as the magnetic force decreases, hook 12 will return to the first position and be recessed within first component 14. Hook 12 may be biased by a spring or simply by gravity causing the hook to rotate about pivot 16. Thus, as the components are moved away from each other, hook 12 will automatically move back to the recessed first position 18 so as not to project above the surface of first component 14.

Figure 6:
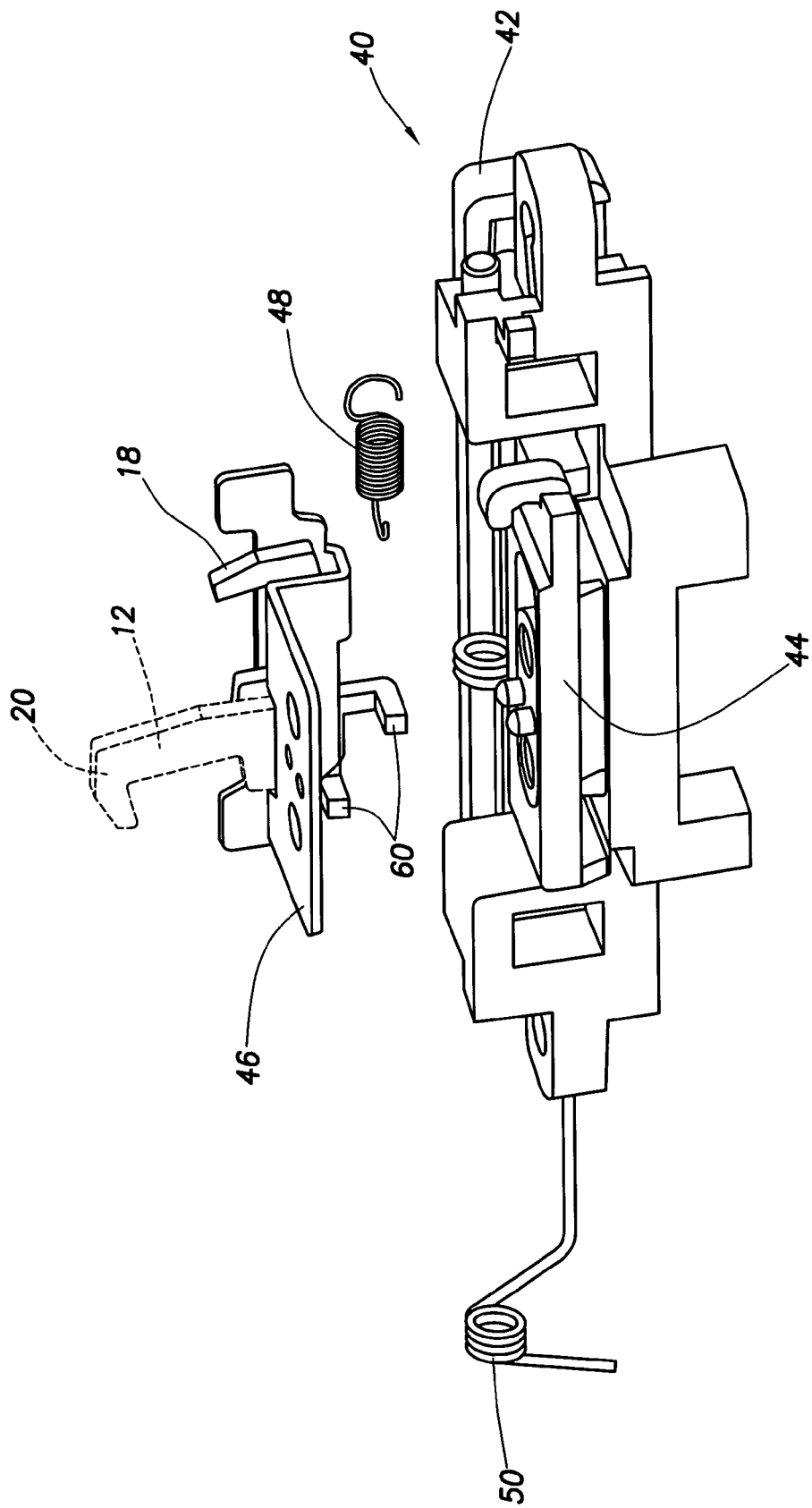
FIG. 6 shows a partially exploded view of the release mechanism of FIG. 4.

Referring now to FIGS. 4-6, release mechanism 40 comprises push-button 42 that actuates a cam slider 44 that engages hook 12. Release mechanism 40 also comprises hook retainer 46 that provides a pivot connection to hook 12. Spring 48 and spring 50 bias, respectively, cam slider 44 and push-button 42 to an initial position where hook 12 can freely pivot. Hook 12 may also have a spring that biases it to the recessed first position 18 or may be weight-biased such that gravitational force pulls the hook to the first position.

The actuation of release mechanism 40 is performed by depressing push-button 42 so as to translate cam slider 44. As shown in FIG. 5, as push-button 42 is depressed, angled surface 52 engages cam surface 54 on cam slider 44 and translates the cam slider perpendicular relative to the direction the button is pushed. Stationary guide 56 controls the direction of motion of cam slider 44 and provides a mounting location for hook retainer 46. As cam slider 44 translates, slider tab 58 contacts hook tab 60 (see FIG. 6) and causes hook 12 to release from receptacle 22. Once released from receptacle 22, hook 12 can rotate from the second position 20 to the first position 18.

Once push-button 42 is released, spring 48 pulls cam slider 44 back to its initial position and spring 50 pushes button 42 back to its initial position. Absent magnetic attraction of magnet 26, hook 12 will remain in the recessed first position 18. Therefore, to separate first component 14 from second component 24, push-button 42 is depressed so as to disengage hook 12 from receptacle 22. The components are then moved apart and push-button 42 can be released. Releasing push-button 42 will not extend hook 12 outside of first component 14.

Hook 12 may be partially or wholly constructed of sheet metal or any other material that would be attracted by magnet 26. Magnet 26 may be a permanent magnet having a sufficient magnetic field to attract hook 12 without detrimentally affecting the performance of the portable computer system or display.

Figure 7:
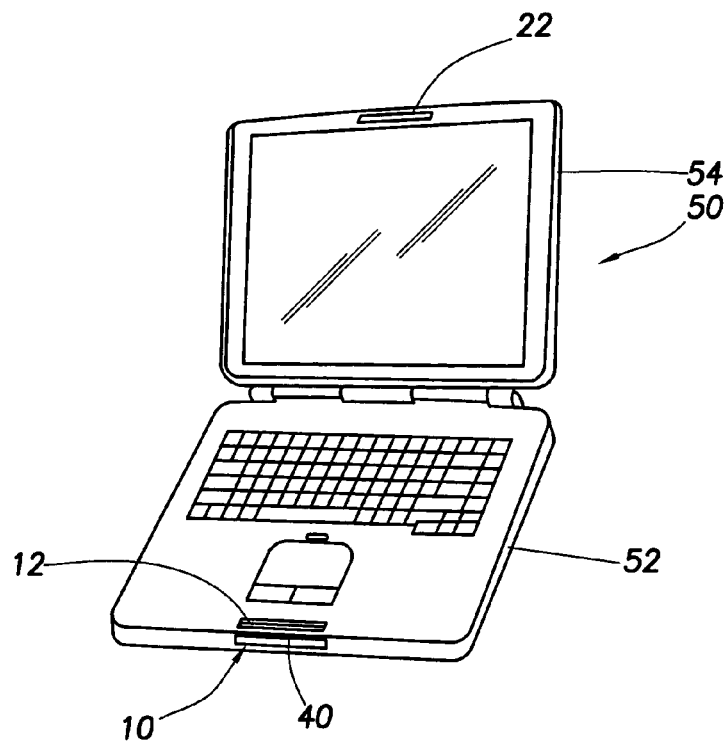
FIG. 7 shows a notebook-type portable computer system in accordance with embodiments of the invention.

Referring now to FIG. 7, latch mechanism 10 is installed on a notebook-type portable computer system 50. Hook 12 and release mechanism 40 are installed on main chassis 52. Magnet 26 and receptacle 22 are disposed on display panel 54. In alternate embodiments, the placement of the components could be reversed.

Figure 8:
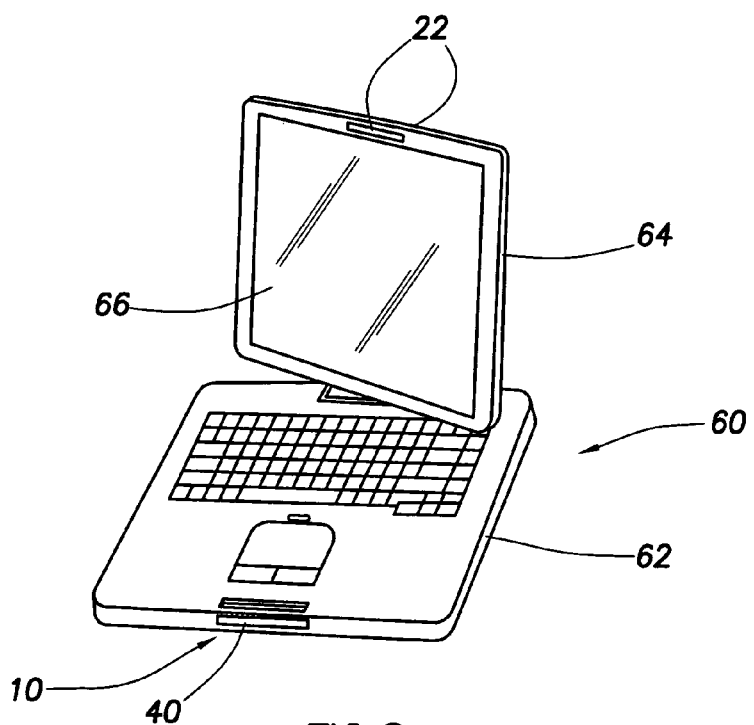
FIG. 8 shows a tablet-type portable computer system in accordance with embodiments of the invention.

Referring now to FIG. 8, latch mechanism 10 could be installed on a tablet-type portable computer system 60. Tablet system 60 comprises main chassis 62 to which a display panel 64 is pivotally connected. Display panel 64 can be closed with screen 66 facing chassis 62 or facing away from the chassis. Because display panel 64 can be closed in one of two arrangements. In some embodiments, magnet 26 is located near the mid-plane of display panel 64 with a receptacle 22 located on either surface of the panel. In this manner, latch mechanism 10 operates with panel 62 in either position. In alternate embodiments, the placement of the components could be reversed.

The above discussion is meant to be illustrative of the principles and various embodiments of the present invention. Numerous variations and modifications will become apparent to those skilled in the art once the above disclosure is fully appreciated. For example, the orientation and arrangement of the hook and receptacle could be reversed such that the push-button would be on the second component and the receptacle on the first component.

What is claimed is:

1. A latching mechanism comprising:
   a hook rotatably connected to and disposed within a first component, wherein said hook has a first position recessed within the first component and a second position projecting from the first component;
   a receptacle disposed within a second component and engaged with said hook when said hook is in the second position;
   a magnet disposed within the second component, wherein said magnet moves said hook from the first position to the second position as the second component is disposed in close proximity to the first component; and
   a push-button release mechanism disposed within the first component, wherein said release mechanism moves said hook from the second position so as to disengage said hook from said receptacle.

2. The latching mechanism of claim 1 wherein said hook is biased to the first position.

3. The latching mechanism of claim 1 further comprising a spring that biases said hook to the first position.

4. The latching mechanism of claim 2 wherein said hook is weight-biased to the first position.

5. The latching mechanism of claim 1 wherein said hook rotates about a pivot axis between the first position and the second position.

6. The latching mechanism of claim 1 wherein said push-button release mechanism further comprises:
   a cam slider that moves said hook from the second position to the first position;
   a cam surface that engages said cam slider; and
   a button connected to said cam surface.

7. The latching mechanism of claim 6 further comprising a spring that urges said cam slider to a position that enables said hook to freely pivot.

8. The latching mechanism of claim 6 further comprising a spring that urges said button to a non-actuated position.

9. The latching mechanism of claim 6 wherein said cam slider moves in a direction perpendicular to a pivot axis and said cam surface moves in a direction parallel to the pivot axis.

10. The latching mechanism of claim 1 wherein said push-button release mechanism further comprises:
    a button actuatable from outside the first component;
    a cam surface connected to said button; and
    a cam slider engages said cam surface and moves said hook from the second position to the first position.

11. The latching mechanism of claim 1 wherein the first component is a main chassis of a notebook computer system and the second component is a display panel of a notebook computer system.

12. The latching mechanism of claim 1 wherein the first component is a main chassis of a tablet computer system and the second component is a display panel of a tablet computer system.

13. A portable computer system comprising:
    a display panel movably connected to a main chassis;
    a hook rotatably connected to said main chassis, wherein said hook has a first position recessed within said main chassis and a second position extending from a slot in said main chassis;
    a receptacle disposed within said display panel, wherein said receptacle is operable to engage said hook;
    a magnet disposed within said display panel, wherein said magnet moves said hook from the first position to the second position as said display panel is disposed in close proximity to said main chassis; and
    a push-button release mechanism disposed within said main chassis, wherein said release mechanism is operable to disengage said hook from said receptacle.

14. The portable computer system of claim 13 wherein said hook is biased to the first position.

15. The portable computer system claim 13 wherein said hook is weight-biased to the first position.

16. The portable computer system claim 13 further comprising a spring that biases said hook to the first position.

17. The portable computer system of claim 13 wherein said push-button release mechanism further comprises:
    a button connected to said main chassis and actuatable from outside said main chassis;

a cam surface attached to said button;

a cam slider in contact with said cam surface, wherein said cam slider moves said hook from the second position to the first position, wherein said cam slider moves perpendicular to said button.

18. The portable computer system of claim 13 wherein said push-button release mechanism further comprises:

a button connected to said main chassis;

a cam surface attached to said button;

a cam slider in contact with said cam surface, wherein said cam slider moves said hook from the second position to the first position, wherein said cam slider moves perpendicular to said button.

19. The portable computer system of claim 13 wherein said display panel is hingeably connected to said main chassis.

20. The portable computer system of claim 13 wherein said display panel is pivotally connected to said main chassis.

* * * * *

UNITED STATES PATENT AND TRADEMARK OFFICE
CERTIFICATE OF CORRECTION

PATENT NO. : 7,405,927 B2
APPLICATION NO. : 10/938791
DATED : July 29, 2008
INVENTOR(S) : Jeffrey A. Lev It is certified that error appears in the above-identified patent and that said Letters Patent is hereby corrected as shown below:

In column 4, line 60, in Claim 15, after "system" insert -- of --.

In column 4, line 62, in Claim 16, after "system" insert -- of --.

Signed and Sealed this

Third Day of March, 2009

JOHN DOLL
*Acting Director of the United States Patent and Trademark Office*